(12) United States Patent
Lin et al.

(10) Patent No.: US 10,417,086 B2
(45) Date of Patent: Sep. 17, 2019

(54) DATA WRITE METHOD AND MEMORY STORAGE DEVICE USING THE SAME

(71) Applicant: Winbond Electronics Corp., Taichung (TW)

(72) Inventors: Chi-Shun Lin, San Jose, CA (US); Ming-Huei Shieh, San Jose, CA (US)

(73) Assignee: Winbond Electronics Corp., Taichung (TW)

( * ) Notice: Subject to any disclaimer, the term of this patent is extended or adjusted under 35 U.S.C. 154(b) by 137 days.

(21) Appl. No.: 15/674,520

(22) Filed: Aug. 11, 2017

(65) Prior Publication Data

US 2019/0050285 A1 Feb. 14, 2019

(51) Int. Cl.
G06F 11/10 (2006.01)

(52) U.S. Cl.
CPC ...... *G06F 11/1044* (2013.01); *G06F 11/1048* (2013.01)

(58) Field of Classification Search
CPC .................................................. G06F 11/1044
See application file for complete search history.

(56) References Cited

U.S. PATENT DOCUMENTS

| | | | |
|---|---|---|---|
| 8,583,986 B2 | 11/2013 | Keeler et al. | |
| 2004/0225943 A1* | 11/2004 | Brueggen | H03M 13/01 714/758 |
| 2008/0163033 A1* | 7/2008 | Yim | G06F 11/1008 714/785 |
| 2010/0306582 A1 | 12/2010 | Han et al. | |
| 2012/0069626 A1* | 3/2012 | Nakano | G11C 13/0033 365/148 |
| 2013/0301335 A1* | 11/2013 | Ong | G11C 29/06 365/148 |
| 2018/0075902 A1* | 3/2018 | Shirakawa | G06F 11/1068 |

FOREIGN PATENT DOCUMENTS

| | | |
|---|---|---|
| CN | 101211667 | 7/2008 |
| TW | I308760 | 4/2009 |

* cited by examiner

*Primary Examiner* — Guy J Lamarre
(74) *Attorney, Agent, or Firm* — JCIPRNET

(57) ABSTRACT

A data write method for writing data is provided. The data writing method is adapted to a memory controller adopting an ECC scheme and includes: encoding the data to generate a codeword; writing the codeword into the memory array according to a first write condition; and performing a verify operation. The step of performing the verify operation includes: reading the codeword from the memory array; comparing the read codeword with the codeword and obtaining an error bit number of the read codeword; decoding the read codeword to generate a decoded data by an ECC decoder; comparing the decoded data with the data; and comparing the error bit number of the read codeword with a pass threshold if the decoded data is identical to the data. If the error bit number of the read codeword is greater than the pass threshold, the data write method further comprises writing the codeword into the memory array according to a second write condition, where the second write condition is different from the first write condition. In addition, a memory storage device using the data write method is also provided.

20 Claims, 6 Drawing Sheets

DATA WRITE METHOD AND MEMORY STORAGE DEVICE USING THE SAME

BACKGROUND OF THE INVENTION

1. Field of the Invention

The invention relates to a memory storage device, and more particularly, relates to a data write method and a memory storage device using the data write method.

2. Description of Related Art

Generally, data to be written to a rewritable non-volatile memory (NVM) may be encoded according to an error correcting codes (ECC). Due to defects of the memory cells or some other factors for writing the encoded data, the encoded data may not be correctly written into the NVM. In order to ensure the validity of the encoded data after being written into the NVM, the encoded data written in the NVM may be read again for verification. If one or more error bits exist in the read encoded data, the original encoded data may be written again until the verification is passed.

Once a stuck bit exists, the encoded data may be written again and again and thus causes longer write time. In some cases, correct bits may reverse or flip and become error bits when being applied with the write voltage again and again. Moreover, remaining life of a bit may be negatively correlated to the written times of the bit. Therefore, how to provide an efficient write scheme to improve write time and power, and reduce unnecessary write voltage applied on the memory cells to improve the reliability, is one of the major subjects for person skilled in the art.

SUMMARY OF THE INVENTION

Accordingly, the invention is directed to a data write method and a memory storage device using the data write method. By adopting the data write method, the average write time may be reduced thus the system efficiency may be improved.

An exemplary embodiment of the invention provides a data write method for writing data. The data write method is adapted to a memory controller adopting an ECC scheme and includes: encoding the data to generate a codeword; writing the codeword into the memory array according to a first write condition; and performing a verify operation. The step of performing the verify operation includes: reading the codeword from the memory array; comparing the read codeword with the codeword and obtaining an error bit number of the read codeword; decoding the read codeword to generate a decoded data by an ECC decoder; comparing the decoded data with the data; and comparing the error bit number of the read codeword with a pass threshold if the decoded data is identical to the data. If the error bit number of the read codeword is greater than the pass threshold, the data write method further includes writing the codeword into the memory array according to a second write condition, where the second write condition is different from the first write condition.

Another exemplary embodiment of the present invention provides a memory storage device. The memory storage device includes a memory array and a memory controller coupled to the memory array and adopting an ECC scheme. The memory controller is configured to encode data to generate a codeword, write the codeword into the memory array according to a first write condition, and perform a verify operation. When the memory controller performs the verify operation, the memory controller reads the codeword from the memory array, compares the read codeword with the codeword and obtains an error bit number of the read codeword, decodes the read codeword to generate a decoded data by an ECC decoder, compares the decoded data with the data, and compares the error bit number of the read codeword with a pass threshold if the decoded data is identical to the data. If the error bit number of the read codeword is greater than the pass threshold, the memory controller further writes the codeword into the memory array according to a second write condition, where the second write condition is different from the first write condition.

Based on the above, by adopting the data write method and the memory storage device provided in the invention, data is encoded into a codeword and the codeword is read subsequently for verifying if there are too many error bits exited in the read codeword. Another write condition different from the original write condition may be used to write the codeword again if the verify operation is not passed. Therefore, the error bit of the read codeword could be fixed by another write of the codeword according to another write condition. Accordingly, the average write time may be reduced thus the system efficiency may be improved.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
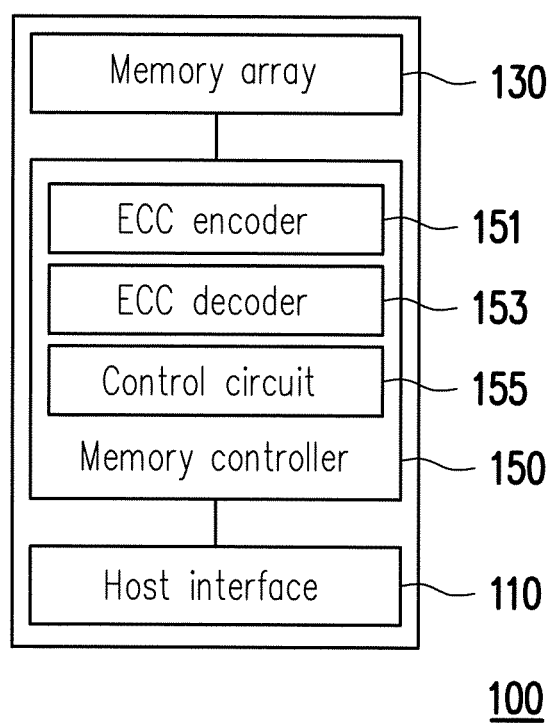
FIG. 1 is a block diagram illustrating a memory storage device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a memory storage device according to an embodiment of the invention. Referring to FIG. 1, the memory storage device 100 includes a host interface 110, a memory array 130 and a memory controller 150. The memory controller 150 is coupled to the host interface 110 and the memory array 130. In the present embodiment, the memory storage device 100 is a non-volatile memory, used for storing data and being accessed by a host system.

The host interface 110 is coupled to the memory controller 150 and configured to couple to the host system. In the present embodiment, the host interface 110 is coupled to the host system for establishing a communication between the host system and the memory controller 150. In the present embodiment, the host interface 110 is compatible with a common flash memory interface (CFI) standard, but the invention is not limited thereto. In other embodiments, the host interface 110 may be compatible with a serial advanced technology attachment (SATA) standard, a peripheral component interconnect Express (PCI-E) interface standard, a universal serial bus (USB) standard, an integrated device electronics (IDE) interface standard or other suitable standards.

The memory array 130 is coupled to the memory controller 150 and includes a plurality of memory cells. In the present embodiment, the memory array 130 is configured to store data and be read and written by the host system and the memory controller 150.

The memory controller 150 is coupled to the host interface 110 and the memory array 130. In the present embodiment, the memory controller 150 includes an ECC encoder 151 and an ECC decoder 153 and a control circuit 155. The ECC encoder 151 and the ECC decoder 153 are both adopting a BCH 3-bits ECC scheme, but the invention is not limited thereto. In the present embodiment, the memory controller 150 receives a write command from the host system for writing data into the memory array 130. The memory controller 150 may perform the data write method introduced in the invention for write the data correctly and effectively. It is noted that the memory controller 150 may be implemented in a form of hardware or firmware, and responsible for managing the overall operations of the memory storage device 100.

Figure 2:
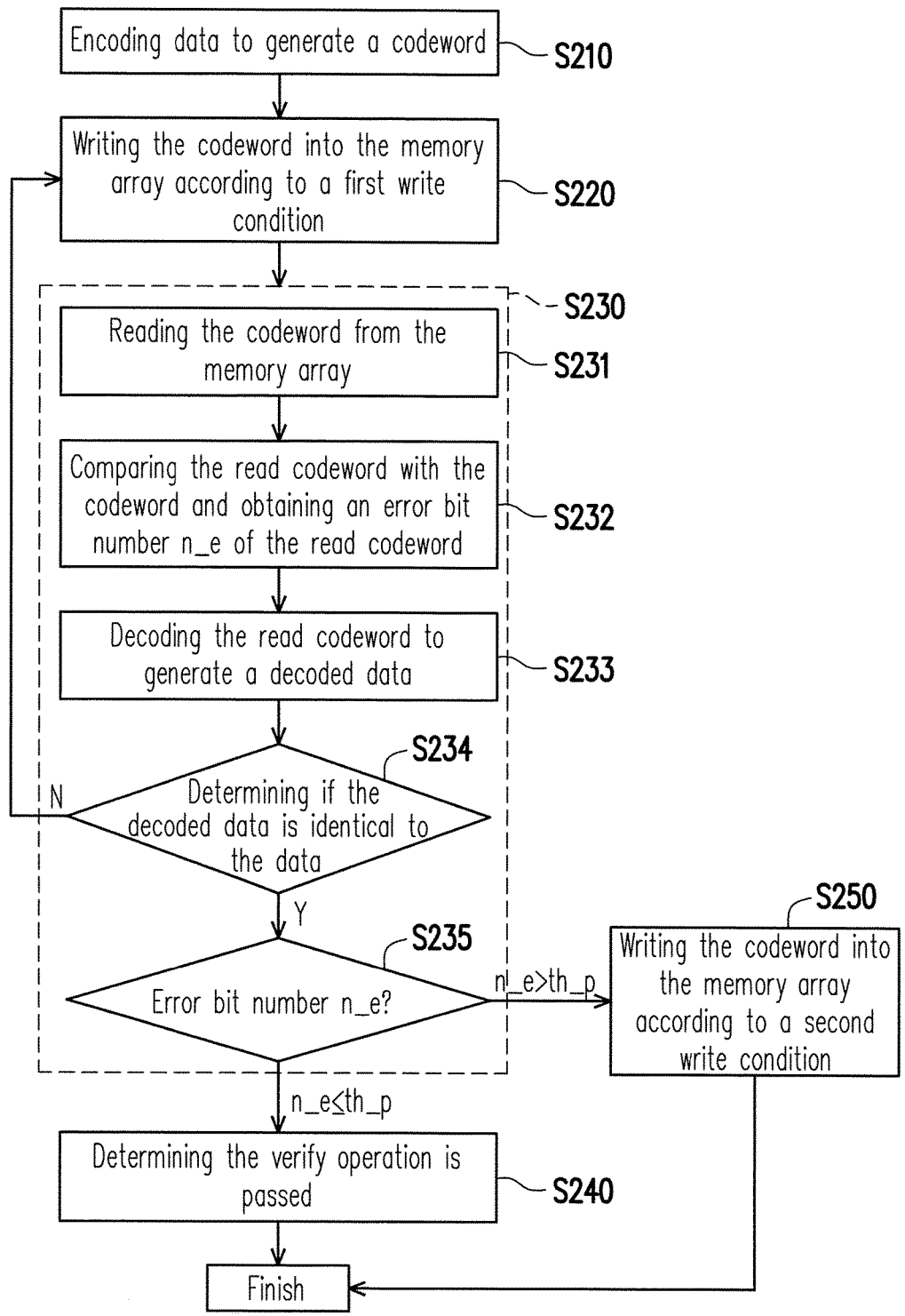
FIG. 2 is a flowchart illustrating a data write method according to an embodiment of the invention.
Figure 3:
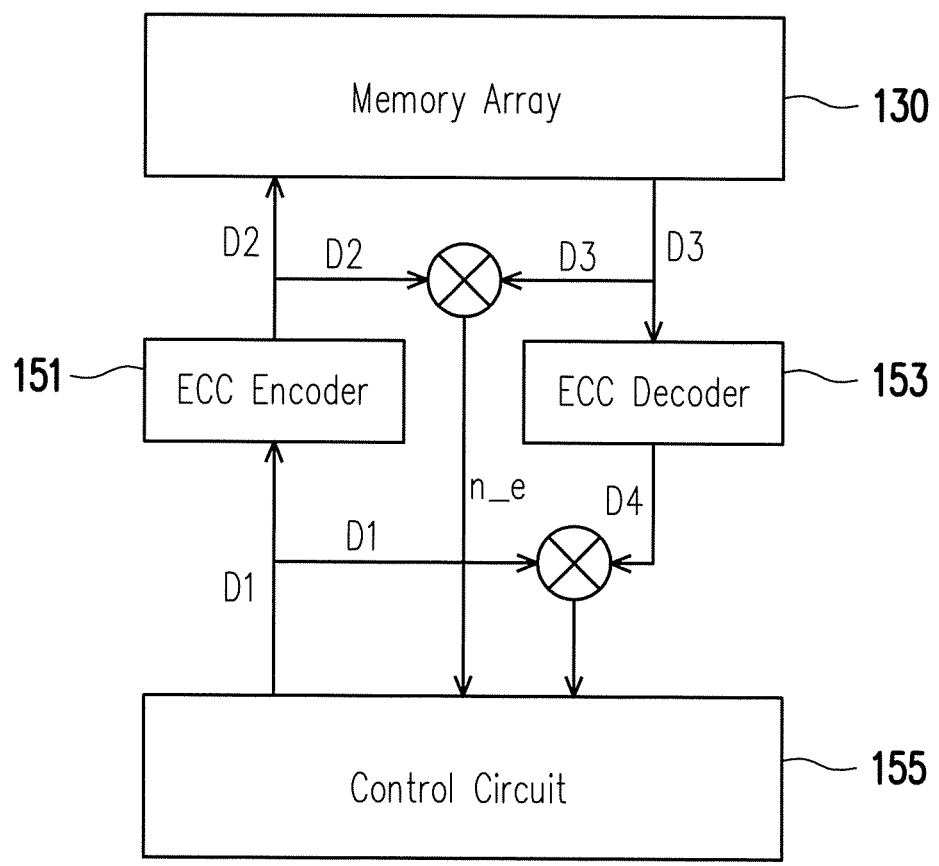
FIG. 3 is a schematic diagram illustrating a data write method according to an embodiment of the invention.

FIG. 2 illustrates a flowchart of a data write method according to an embodiment of the invention. FIG. 3 illustrates a schematic diagram of a data write method according to an embodiment of the invention. The data write method may be performed by the memory storage device 100 of the embodiment of FIG. 1. Therefore, the data write method may be illustrated by referring to the aforementioned memory storage device 100 in the present embodiment.

In the present embodiment, the memory storage device 100 is adopting a BCH 3-bits ECC scheme, but the invention is not limited thereto. For example, when the host system issues a read command to the memory controller 150, the memory controller 150 may retrieve data according to the read command from the memory array 130. For correctly returning the read data, the memory controller 150 may first detect and correct error bits of the data read by the host system. In the present embodiment, the memory controller 150 may detect and correct three error bits at most for a predetermined data length in the read operation, which means that the memory storage device 100 can tolerate at most three error bits existed in the data written and stored in the memory array 130.

Referring to FIG. 2, in the present embodiment, the memory controller 150 may receive a write command from a host system for writing data. In response to the write command, the memory controller 150 may firstly encode the data to generate a codeword (S210), then write the codeword into the memory array 130 according to a first write condition (S220). For correctly writing the data, the memory controller 150 performs a verify operation for verifying if the write operation is acceptable (S230). To be specific, the write operation is acceptable if the number of different bits between the codewords written into and read from the memory array 130 is few enough, and vice versa. If the verify operation is passed, the memory controller 150 may determine that the data is successfully and completely written into the memory array 130. If the verify operation is not passed, the memory controller 150 may at least perform another write operation depending on the verification result, in order to make the data be written in the memory array 130 correctly or to make the data stored in the memory array 130 could be read correctly. Details thereof are described in the following descriptions accompanied by FIG. 3.

In the present embodiment, the memory controller 150 encodes the data D1 of 32 bits to generate a codeword D2 of 50 bits. Therefore, input of the ECC encoder 151 is data D1 of 32 bits. The ECC encoder 151 of the memory controller 150 may encode the data D1 and generate the codeword D2 as an output of the ECC encoder 151, where the codeword D2 may consist of 32 bits of the data and 18 bits of parity bits or check bits. Subsequently, the memory controller 150 writes the codeword D2 into the memory array 130 according to the first write condition. For example, the memory controller 150 may apply a first write voltage with a first write pulse duration for writing the codeword D2 into the memory array 130. However, it should be noted that the codeword D2 may not likely to be written correctly due to the defect of the memory cells, stuck bits of the memory array 130, or any other reasons. In order to make sure that the data D1 or the codeword D2 is successfully or correctly written, the verify operation is performed. In the present embodiment, a verify operation is always performed after a codeword had been written into the memory array 130. Details of the verify operation are illustrated in the following.

The memory controller 150 reads the codeword written in the last write operation from the memory array 130 (S231), compares the read codeword and the codeword and obtains an error bit number n_e of the read codeword (S232). Subsequently, the memory controller 150 may decode the read codeword to generate a decoded data by the ECC decoder 153 (S233), and compare the decoded data with the data to determine if the decoded data is identical to the data (S234). If the decoded data is different from the data, which means that the error of the read codeword is too severe to be corrected by the ECC decoder 153, the memory controller 150 would write the codeword into the memory array 130 again (S220) and perform the verify operation again (S230). Otherwise, the memory controller 150 would compare the error bit number n_e of the read codeword with a pass threshold th_p to determine if the verify operation is passed (S235). If the error bit number n_e of the read codeword is not greater than the pass threshold th_p, the memory controller 150 would determine the verify operation is passed (S240) and the write operation in response to the write command is finished. Otherwise, the memory controller 150 would write the codeword into the memory array 130 according to another write condition (i.e., second write condition) (S250) and the write operation in response to the write command is finished.

As shown in FIG. 3, the size of the read codeword D3 is 50 bits and it may be decoded to generate the decoded data D4 of 32 bits. In the present embodiment, the read codeword D3 is compared with the codeword D2 to obtain an error bit number n_e of the read codeword D3, and the decoded data D4 is compared with the data D1 to check the correctness of the decoded data D4.

It should be noted that, the BCH 3-bit ECC scheme is adopted in the present embodiment, so the memory controller 150 is capable of correcting at most three error bits in the data read from the memory array 130. Accordingly, a pass threshold th_p could be set by not exceeding the capacity of the BCH 3-bit ECC scheme. In the present embodiment, if the error bit number n_e of the read codeword is not greater than the pass threshold th_p (e.g., zero), the verify operation is determined to be passed by the memory controller 150. Once the verify operation is passed, the data is determined to be successfully and completely written into the memory array 130, therefore the memory controller 150 finishes writing the data. On the other hands, if the error bit number n_e of the read codeword is greater than the pass threshold th_p, the verify operation is not passed, and the memory controller would write the codeword into the memory array 130 again but according to the second write condition.

It is noted that, in the present embodiment, the second write condition has a property selected from one or a combination of: a second write voltage higher than the first write voltage of the first write condition, a second write pulse duration longer than the first write pulse duration of the first write condition, and an opposite polarity write corresponding to at least one error bit of the read codeword.

Accordingly, by adopting the introduced data write method, few error bits existed in the read codeword are likely to be corrected by writing the codeword again according to the second write condition.

Figure 4:
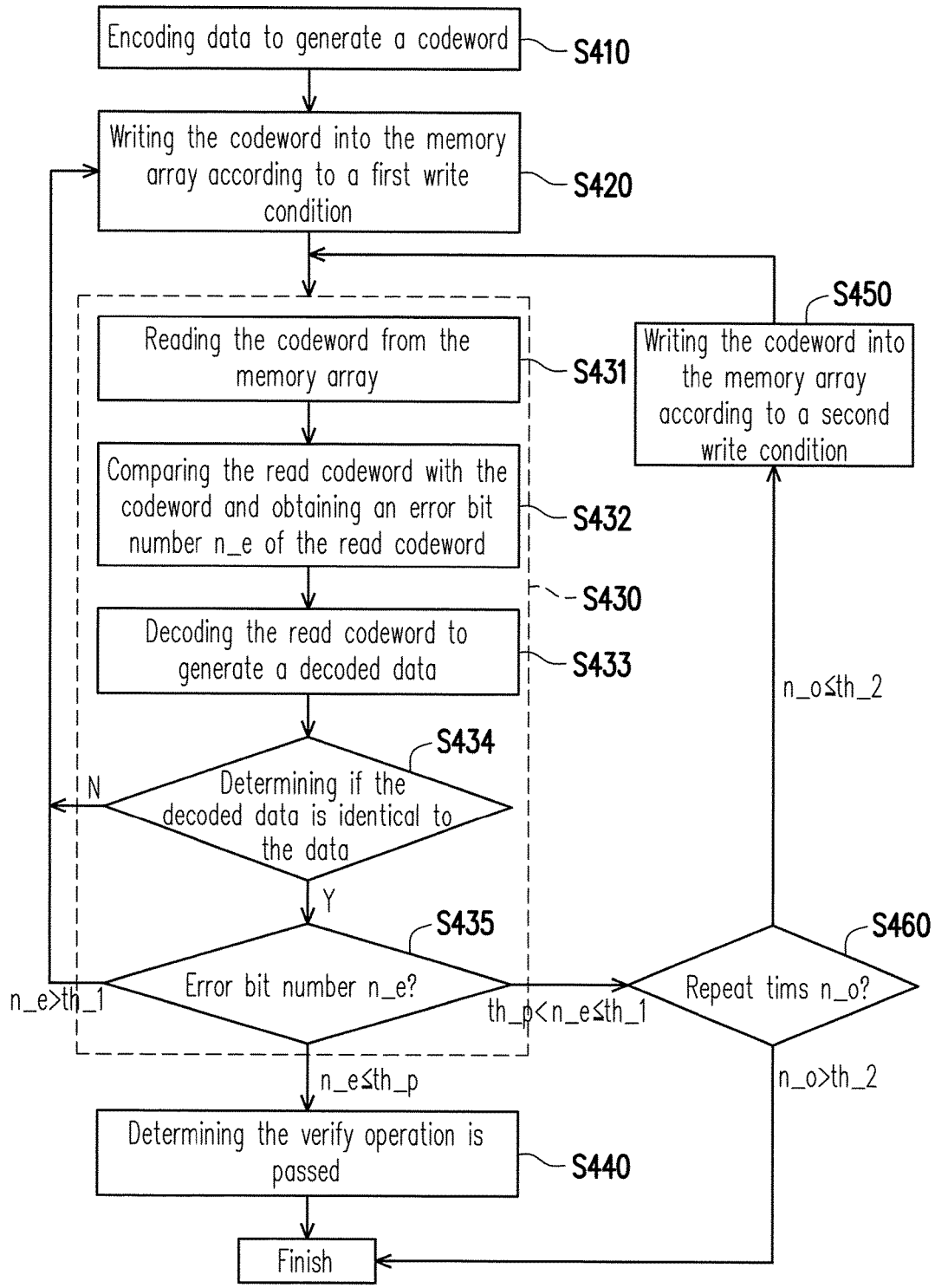
FIG. 4 is a flowchart illustrating a data write method according to an embodiment of the invention.

FIG. 4 illustrates a flowchart of a data write method according to an embodiment of the invention. The data write method may be performed by the memory storage device 100 of the embodiment of FIG. 1. Therefore, the data write method may be illustrated by referring to the aforementioned memory storage device 100 in the present embodiment.

The differences between the present embodiment and the embodiment of FIG. 2 is that the write operation responding to the write command does not finish after the codeword is written according to the second write condition. In the present embodiment, the codeword is written according to the second write condition repeatedly until the verify operation is passed. In addition, the memory controller may selectively limit the repeat times and change the conditions of writing the codeword according to the second write condition. By using the verify operation following the step of writing the codeword according to the second write condition, whether the read codeword has the stuck bit(s) can be determined. Moreover, by limiting the repeat times of the step of writing the codeword according to the second write condition, the data write method can be terminated when the repeat times reaches the limitation and the stuck bit(s) is still not recovered by the writing step according to the second write condition. Therefore, the writing time will not be wasted on the stuck bit(s) which are hard to be recovered. And, the data write method can achieve higher efficiency.

Referring to FIG. 4, steps S410, S420, S431, S432, S433, S434, S440 and S450 are similar to steps S210, S220, S231, S232, S233, S234, S240, and S250 respectively, therefore which are not repeated herein. In the present embodiment, after the decoded data is determined to be identical to the data, the error bit number n_e of the read codeword is not only compared with the pass threshold th_p (e.g., zero) but also compared with a first threshold th_1 (e.g., one) greater than the pass threshold th_p (S435). The first threshold does not exceed a capacity of an ECC scheme adopted by the memory controller for reading data. If the error bit number n_e of the read codeword is not greater than the pass threshold th_p, the memory controller 150 would determine the verify operation is passed (S440) and the write operation in response to the write command is finished. If the verify operation is not passed and the error bit number n_e of the read codeword is greater than the first threshold th_1, the memory controller 150 would write the codeword into the memory array 130 according to the first write condition again (S420), and performs the verify operation again (S430).

If the verify operation is not passed and the error bit number n_e of the read codeword is not greater than the first threshold th_1, the memory controller 150 would repeatedly write the codeword into the memory array 130 according to the second write condition unless a repeat times n_o exceeds a second threshold th_2 (e.g., five). Specifically, the memory controller 150 may record the repeat times n_o that the codeword is written according to the second write condition. Once the verify operation is not passed and the error bit number n_e of the read codeword is determined not greater than the first threshold th_1, the memory controller 150 would compare the repeat times n_o with the second threshold th_2 (S460). If the repeat times n_o does not exceed the second threshold th_2, the memory controller 150 would write the codeword into the memory array 130 according to the second write condition (S450), perform the verify operation again (S430), and the repeated times n_o would be added by one. Otherwise, the memory controller 150 finishes writing the data.

In some embodiments, once the decoded data is identical to the data but the verify operation is not passed, the memory controller 150 may use different write condition to write the codeword again according to the error bit number n_e of the read codeword. Exemplary embodiment is illustrated in the following.

Figure 5:
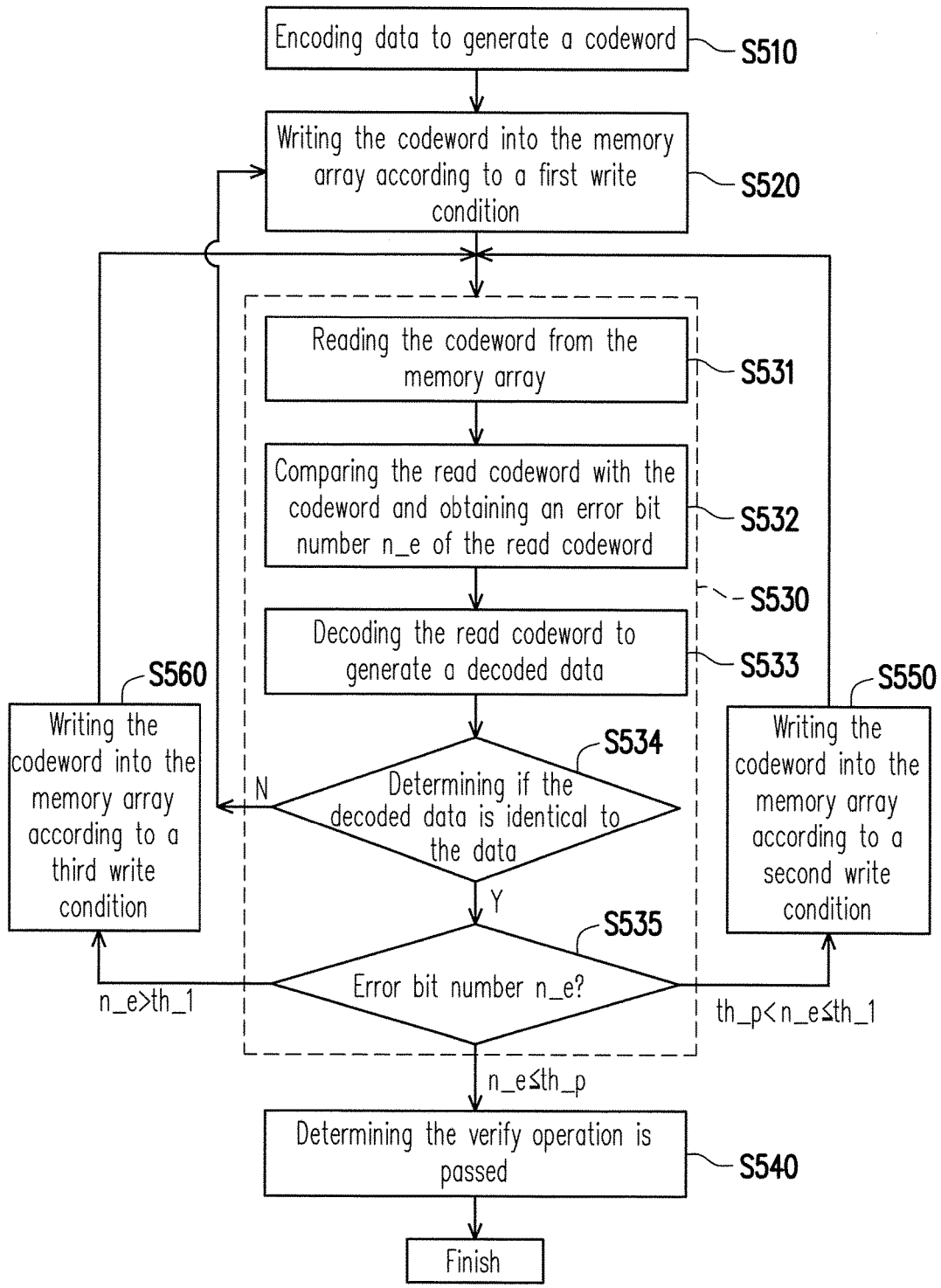
FIG. 5 is a flowchart illustrating a data write method according to an embodiment of the invention.

FIG. 5 illustrates a flowchart of a data write method according to an embodiment of the invention. The data write method may be performed by the memory storage device 100 of the embodiment of FIG. 1. Therefore, the data write method may be illustrated by referring to the aforementioned memory storage device 100 in the present embodiment. Referring to FIG. 5, steps S510, S520, S531, S532, S533, S534, S540 and S550 are similar to steps S410, S420, S431, S432, S433, S434, S440, and S450 respectively, therefore which are not repeated herein. In the present embodiment, the memory controller 150 compares the error bit number n_e of the read codeword with the pass threshold th_p and the first threshold th_1 (S535), and determines the verify operation is passed if the error bit number n_e is not greater than the pass threshold th_p (S540), as in the embodiment of FIG. 4. However, the memory controller 150 writes the codeword into the memory array 130 according to a third write condition instead of the first write condition if the verify operation is not passed and the error bit number n_e is greater than the first threshold th_1 (S560). If the verify operation is not passed and the error bit number n_e is not greater than the first threshold th_1, the memory controller 150 writes the codeword into the memory array 130 according to the second write condition (S550). In the present embodiment, the verify operation is always performed (S530) after the coedword is written into the memory array 130 regardless of the used write condition.

It is noted that, in the present embodiment, the third write condition has a property selected from one or a combination of: a third write voltage higher than the second write voltage of the second write condition, a third write pulse duration longer than the second write pulse duration of the second write condition, and an opposite polarity write corresponding to the error bits of the read codeword.

It is also noted that the repeat times of writing the codeword into the memory array 130 according to the second write condition or the third write condition can be limited by similar ways as taught in the embodiment of FIG. 4, exemplary embodiment is illustrated in the following.

Figure 6:
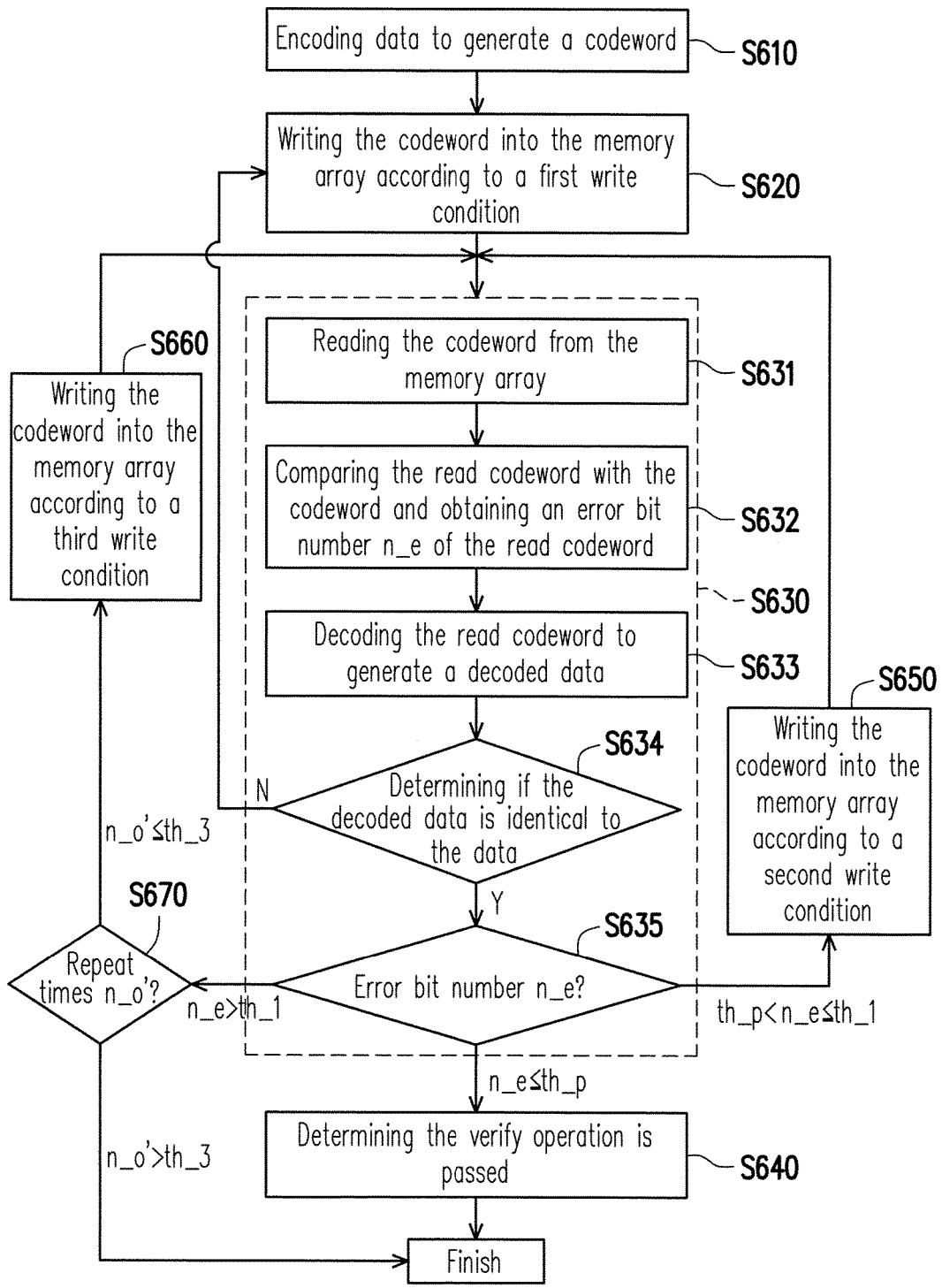
FIG. 6 is a flowchart illustrating a data write method according to an embodiment of the invention.

FIG. 6 illustrates a flowchart of a data write method according to an embodiment of the invention. The data write method may be performed by the memory storage device 100 of the embodiment of FIG. 1. Therefore, the data write method may be illustrated by referring to the aforementioned memory storage device 100 in the present embodiment. Referring to FIG. 6, steps of 610, S620, S631, S632, S633, S634, S635, S640, S650, and S660 are similar to steps S510, S520, S531, S532, S533, S534, S535, S540, S550, and S560 respectively, therefore which are not repeated herein. The only difference between the present embodiment and the embodiment of FIG. 5 is that the repeat times that the codeword being written according to the third write condition is limited, therefore the present embodiment has an additional step of S670.

In the present embodiment, if the verify operation is not passed and the error bit number n_e of the read codeword is greater than the first threshold th_1, the memory controller 150 would repeatedly write the codeword into the memory array 130 according to the third write condition unless a repeat times n_o' exceeds a third threshold th_3 (e.g., three). Specifically, the memory controller 150 may record the repeat times n_o' that the codeword is written according to the third write condition. Once the verify operation is not passed and the error bit number n_e of the read codeword is determined to be greater than the first threshold th_1, the memory controller 150 would compare the repeat times n_o' with the third threshold th_3 (S670). If the repeat times n_o' does not exceed the third threshold th_3, the memory controller 150 would write the codeword into the memory array 130 according to the third write condition (S660), perform the verify operation again (S630), and the repeated times n_o' would be added by one. On the other hand, if the verify operation is not passed and the error bit number n_e of the read codeword is not greater than the first threshold th_1, the memory controller 150 would write the codeword into the memory array 130 according to the second write condition (S650) and perform the verify operation again (S630). Otherwise, the memory controller 150 finishes writing the data. In some embodiments, the repeat times that the codeword being written according to the second write condition can be limited by the similar ways, which are not repeated herein.

It is noted that a sensing reference used for reading the codeword may or may not be always the same in every verify operations. In one embodiment, these sensing references are always the same. In another embodiment, the sensing reference is associated with the write condition lastly used for writing the codeword into the memory array 130. For example, for the verify operation following the step of writing the codeword into the memory array 130 according to the first write condition, the memory controller 150 uses a first sensing reference to read the codeword from the memory array 130, while for the verify operation followed by following the step of writing the codeword into the memory array 130 according to the second write condition uses a second sensing reference to read the codeword from the memory array 130. The second sensing reference is different from the first sensing reference. For example, the first sensing reference may be a first voltage reference and the second sensing reference may be a second voltage reference lower than the first voltage reference. However, the invention is not limited herein, the sensing reference may be a current reference as well.

In summary, by adopting the data write method and the memory storage device provided in the invention, data is encoded into a codeword and the codeword is read subsequently for verifying if there are too many error bits exited in the read codeword. Another write condition different from the original write condition (i.e., the first write condition) may be used to write the codeword again if the verify operation is not passed. Therefore, the error bit of the read codeword could be fixed by another write of the codeword according to another write condition. In some embodiments, the error bit(s) of the read codeword may be handled in a loop of write operation using another write condition, so that no matter the error bit(s) is stuck bit(s), it can be handled properly and efficiently in the embodiments of the invention. As a result, average write time may be reduced thus the system efficiency may be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A data write method adapted to a memory controller adopting an ECC scheme for writing data, comprising:
  encoding the data to generate a codeword;
  writing the codeword into the memory array according to a first write condition;
  performing a verify operation comprising:
    reading the codeword from the memory array;
    obtaining an error bit number of the read codeword by comparing the read codeword with the codeword generated from encoding the data;
    decoding the read codeword to generate a decoded data by an ECC decoder;
    comparing the decoded data with the data; and
    comparing the error bit number of the read codeword with a pass threshold if the decoded data is identical to the data; and
  writing the codeword into the memory array according to a second write condition if the error bit number of the read codeword is greater than the pass threshold, wherein the second write condition is different from the first write condition.

2. The data write method as claimed in claim 1, wherein if the decoded data is not identical to the data, the data write method further comprises:
  writing the codeword into the memory array according to the first write condition again; and
  performing the verify operation again.

3. The data write method as claimed in claim 1, wherein the step of comparing the error bit number of the read codeword with the pass threshold if the decoded data is identical to the data further comprises:
  comparing the error bit number of the read codeword with a first threshold greater than the pass threshold,
  wherein if the error bit number of the read codeword is greater than the pass threshold and is less than or equal to the first threshold, the step of writing the codeword into the memory array according to the second write condition is performed,
  wherein the first threshold does not exceed a capacity of an ECC scheme adopted by the memory controller for reading data.

4. The data write method as claimed in claim 3, wherein if the error bit number of the read codeword is greater than the first threshold, the data write method further comprises:
  writing the codeword into the memory array according to the first write condition again; and
  performing the verify operation again.

5. The data write method as claimed in claim 3, further comprising:
  performing the verify operation again; and
  repeating the step of writing the codeword into the memory array according to the second write condition and the step of performing the verify operation if the error bit number of the read codeword is greater than the pass threshold and is less than or equal to the first threshold unless a number of a repeat times exceeds a second threshold.

6. The data write method as claimed in claim 5, wherein the verify operation following the step of writing the codeword into the memory array according to the first write condition uses a first sensing reference to read the codeword from the memory array, and the verify operation following the step of writing the codeword into the memory array according to the second write condition uses a second sensing reference to read the codeword from the memory array, wherein the second sensing reference is different from the first sensing reference.

7. The data write method as claimed in claim 3, wherein if the error bit number of the read codeword is greater than the first threshold, the data write method further comprises:
  writing the codeword into the memory array according to a third write condition; and
  performing the verify operation again;
  wherein the third write condition is different from the second write condition and the first write condition.

8. The data write method as claimed in claim 7, further comprising:
  repeating the step of writing the codeword into the memory array according to the third write condition and the step of performing the verify operation if the error bit number of the read codeword is greater than the first threshold unless a number of the repeat times exceeds a third threshold.

9. The data write method as claimed in claim 1, wherein if the error bit number of the read codeword is not greater than the pass threshold, determining the verify operation is passed.

10. The data write method as claimed in claim 1, wherein the second write condition has a property selected from one or a combination of:
  a write voltage higher than a write voltage of the first write condition,
  a write pulse duration longer than a write pulse duration of the first write condition, and
  an opposite polarity write corresponding to at least one error bit of the read codeword.

11. A memory storage device, comprising:
  a memory array; and
  a memory controller coupled to the memory array and adopting an ECC scheme, wherein the memory controller is configured to encode data to generate a codeword, write the codeword into the memory array according to a first write condition, and perform a verify operation, wherein the verify operation comprises:
    reading the codeword from the memory array;
    obtaining an error bit number of the read codeword by comparing the read codeword with the codeword generated from encoding the data;
    decoding the read codeword to generate a decoded data by an ECC decoder;
    comparing the decoded data with the data; and
    comparing the error bit number of the read codeword with a pass threshold if the decoded data is identical to the data,
  wherein if the error bit number of the read codeword is greater than the pass threshold, the memory controller further writes the codeword into the memory array according to a second write condition, wherein the second write condition is different from the first write condition.

12. The memory storage device as claimed in claim 11, wherein if the decoded data is not identical to the data, the memory controller further writes the codeword into the memory array according to the first write condition again, and performs the verify operation again.

13. The memory storage device as claimed in claim 11, wherein when the memory controller compares the error bit number of the read codeword with the pass threshold and a first threshold larger than the pass threshold,
  wherein if the error bit number of the read codeword is greater than the pass threshold and is less than or equal to the first threshold, the memory controller writes the codeword into the memory array according to the second write condition,
  wherein the first threshold does not exceed a capacity of an ECC scheme adopted by the memory controller for reading data.

14. The memory storage device as claimed in claim 13, wherein if the error bit number of the read codeword is greater than the first threshold, the memory controller writes the codeword into the memory array according to the first write condition again, and performs the verify operation again.

15. The memory storage device as claimed in claim 13, wherein the memory controller performs the verify operation again, and repeatedly writes the codeword into the memory array according to the second write condition and performs the verify operation if the error bit number of the read codeword is greater than the pass threshold and is less than or equal to the first threshold unless a number of a repeat times exceeds a second threshold.

16. The memory storage device as claimed in claim 15, wherein the memory controller uses a first sensing reference to read the codeword from the memory array to perform the verify operation following writing the codeword into the memory array according to the first write condition, and uses a second sensing reference to read the codeword from the memory array to perform the verify operation following writing the codeword into the memory array according to the second write condition, wherein the second sensing reference is different from the first sensing reference.

17. The memory storage device as claimed in claim 13, wherein if the error bit number of the read codeword is greater than the first threshold, the memory controller further writes the codeword into the memory array according to a third write condition, and performs the verify operation again,
  wherein the third write condition is different from the second write condition and the first write condition.

18. The memory storage device as claimed in claim 17, wherein the memory controller repeatedly writes the codeword into the memory array according to the third write condition and performs the verify operation if the error bit number of the read codeword is greater than the first threshold unless a number of a repeat times exceeds a third threshold.

19. The memory storage device as claimed in claim 11, wherein if the error bit number of the read codeword is not greater than the pass threshold, the memory controller determines the verify operation is passed.

20. The memory storage device as claimed in claim 11, wherein the second write condition has a property selected from one or a combination of:
- a write voltage higher than a write voltage of the first write condition,
- a write pulse duration longer than a write pulse duration of the first write condition, and
- an opposite polarity write corresponding to at least one error bit of the read codeword.

* * * * *